United States Patent
Song et al.

(10) Patent No.: US 7,510,291 B2
(45) Date of Patent: Mar. 31, 2009

(54) DIRECT-LIT LCD WITH REFLECTIVE PLATE

(75) Inventors: Si-joon Song, Gyeonggi-do (KR); Eun-jeong Kang, Chungcheongnam-do (KR); Jin-soo Kim, Seoul (KR); Jung-wook Paek, Gyeonggi-do (KR); Sang-hoon Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 9 days.

(21) Appl. No.: 11/339,261

(22) Filed: Jan. 24, 2006

(65) Prior Publication Data

US 2006/0164840 A1 Jul. 27, 2006

(30) Foreign Application Priority Data

Jan. 24, 2005 (KR) ............... 10-2005-0006253

(51) Int. Cl.
*G09F 13/04* (2006.01)
*F21V 7/04* (2006.01)
(52) U.S. Cl. ............... 362/97; 362/609; 362/619
(58) Field of Classification Search .......... 349/113; 362/609, 619, 97
See application file for complete search history.

(56) References Cited

U.S. PATENT DOCUMENTS

| | | | | |
|---|---|---|---|---|
| 3,942,873 A | * | 3/1976 | Shimotakahara | ............ 359/572 |
| 6,204,903 B1 | * | 3/2001 | Hayashi et al. | ............ 349/113 |
| 6,652,113 B2 | * | 11/2003 | Tant | ............ 362/147 |
| 6,704,080 B2 | * | 3/2004 | Hara | ............ 349/113 |
| 6,926,420 B2 | * | 8/2005 | Sung | ............ 362/629 |
| 7,207,708 B2 | * | 4/2007 | Tanaka et al. | ............ 362/619 |
| 2006/0012989 A1 | * | 1/2006 | Lee | ............ 362/231 |
| 2006/0203512 A1 | * | 9/2006 | Ko et al. | ............ 362/609 |

FOREIGN PATENT DOCUMENTS

| | | |
|---|---|---|
| CN | 1534339 A | 8/1994 |
| JP | 2002-372918 A | 12/2002 |
| JP | 1994-235918 A | 10/2004 |
| JP | 2004-319458 A | 11/2004 |

OTHER PUBLICATIONS

English Abstract, Publication No. CN. 1534339A.
English Abstract, Publication No. JP 1994-235918A.

* cited by examiner

*Primary Examiner*—Sandra O'Shea
*Assistant Examiner*—James W Cranson
(74) *Attorney, Agent, or Firm*—MacPherson Kwok Chen & Heid LLP (57) ABSTRACT

The invention provides a reflective plate that includes a first reflective part having a predetermined surface roughness and a second reflective part having a surface roughness that is less than the predetermined surface roughness of the first reflective part. The invention also provides a reflective plate that is capable of supplying a liquid crystal panel with substantially uniform light.

14 Claims, 10 Drawing Sheets
(2 of 10 Drawing Sheet(s) Filed in Color)

FIG. 9

DIRECT-LIT LCD WITH REFLECTIVE PLATE

CROSS-REFERENCE TO RELATED APPLICATIONS

This application claims the benefit and priority of Korean Patent Application No. 10-2005-0006253, filed on Jan. 24, 2005, which is hereby incorporated by reference for all purposes as if fully set forth herein.

BACKGROUND OF THE INVENTION

1. Field of the Invention

The present invention relates to a reflective plate and a liquid crystal display apparatus having the same.

2. Description of the Related Art

Cathode ray tube (CRT) displays are being replaced with flat panel display devices, such as an LCD (liquid crystal display), a PDP (plasma display panel), an OLED (organic light emitting diode), etc.

The LCD includes a liquid crystal panel having a TFT substrate, a color filter substrate, and a liquid crystal layer disposed between the two substrates. Since the liquid crystal molecules are a non-emitting material, the liquid crystal panel requires a backlight unit having a light source. Light from the backlight unit passes through the liquid crystal panel. The transmittance of light depends on an alignment of the liquid crystal.

The liquid crystal panel and the backlight unit are contained in a chassis. The backlight unit may be an edge type or a direct type depending on where the light source is arranged.

The edge type of backlight unit has a structure with a light source that is arranged at a side of a light guide plate. The edge type is widely used in small electronic products, such as laptops, PDAs, etc. because it has a high light uniformity and a relatively long life span and may be used for producing a thin display.

However, LCDs using the direct type have a structure such that one or more light sources are arranged under the liquid crystal panel to irradiate an overall surface of the liquid crystal panel. The direct type uses more light sources than the edge type, making the direct type brighter than the edge type. However, the brightness of the direct type is not uniformly distributed.

Further, the direct type backlight using a light emitting diode (LED) as the light source for the backlight unit generates bright lines on a display screen.

SUMMARY OF THE INVENTION

The present invention provides a reflective plate that supplies a liquid crystal panel with uniform light, and a liquid crystal display having the reflective plate.

Additional features of the invention will be set forth in the description which follows, and in part will be apparent from the description, or may be learned by practice of the invention.

The present invention discloses a reflective plate, including a first reflective part having a predetermined surface roughness; and a second reflective part having a surface roughness that is less than the predetermined surface roughness of the first reflective part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

The patent or application file contains at least one drawing executed in color. Copies of this patent or patent application publication with color drawing(s) will be provided by the U.S. Patent and Trademark Office upon request and payment of the necessary fee.

DESCRIPTION OF THE ILLUSTRATED EMBODIMENTS

Reference will now be made in detail to exemplary embodiments of the invention, examples of which are illustrated in the accompanying drawings, wherein like reference numerals refer to like elements throughout. The embodiments are described below in order to explain the present invention by referring to the figures.

It is understood that when an element or layer is referred to as being "on" or "connected to" or "connected with" another element or layer, it can be directly on or directly connected to or with the other element or layer or intervening elements or layers may be present.

An embodiment of the invention is described below with FIG. 1 and FIG. 2.

Figure 1:
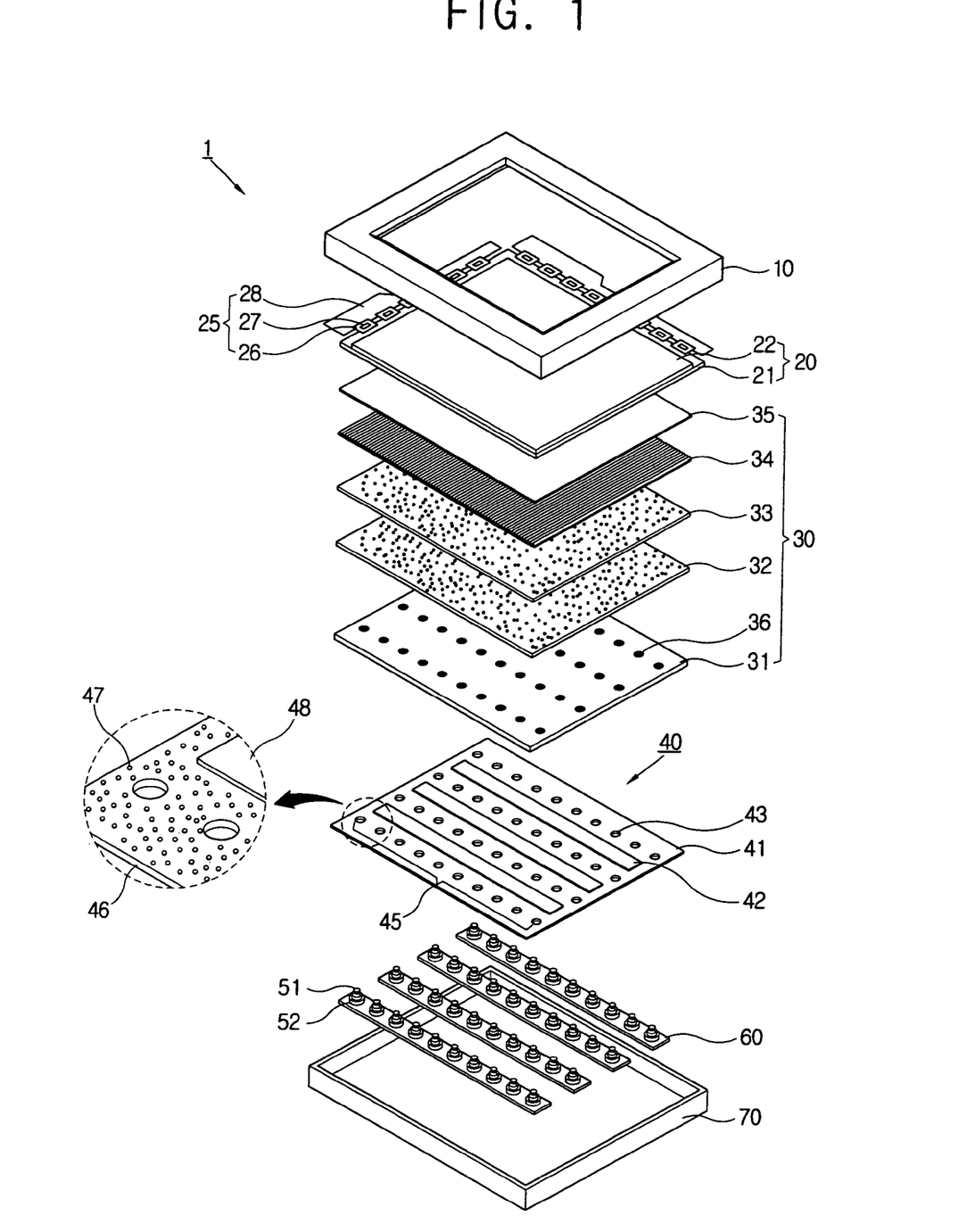
FIG. 1 is an exploded perspective view of an LCD including a reflective plate according to an embodiment of the invention.
Figure 2:
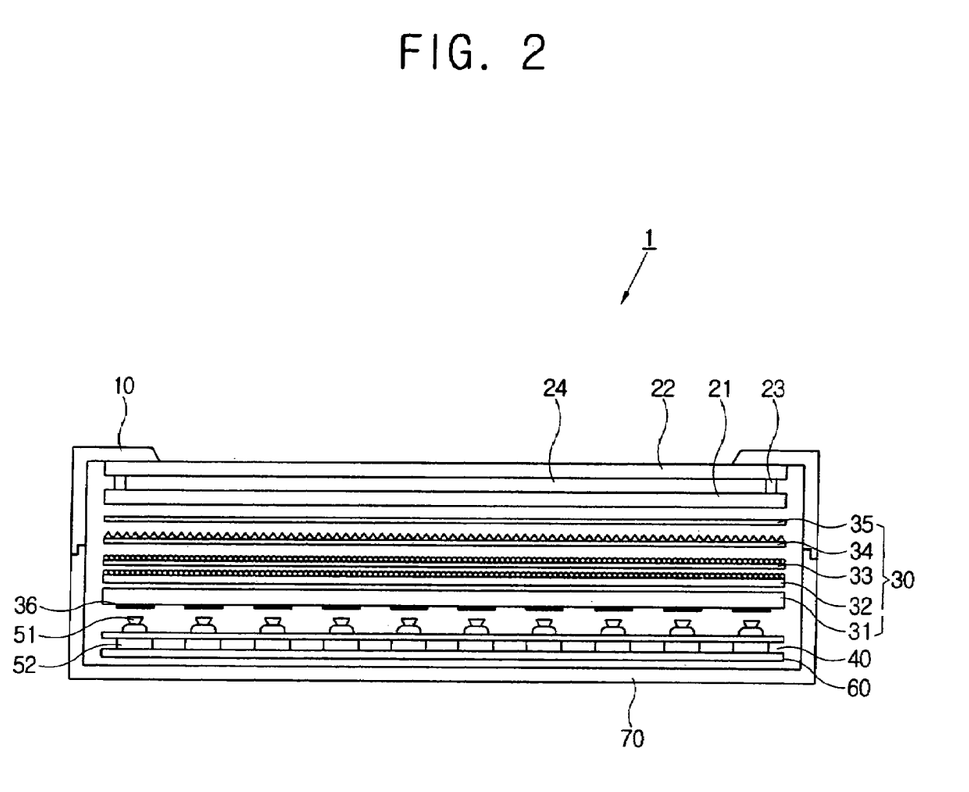
FIG. 2 is a sectional view of the LCD including the reflective plate according to the embodiment of the invention.

As shown in FIG. 1 and FIG. 2, an LCD 1 includes an liquid crystal panel 20, a plurality of optical members 30 provided in a rear portion of the liquid crystal panel 20, LEDs 51 arranged along the rear portion of the liquid crystal panel 20, a reflective plate 40 arranged below the LEDs 51, and an LED circuit substrate 60 having LEDs 51 mounted thereon.

The liquid crystal panel 20 includes a TFT substrate 21 having TFTs formed thereon, a color filter substrate 22 opposing the TFT substrate 21, a sealant 23 coupling the foregoing substrates 21 and 22 and forming a gap, and a liquid crystal layer 24 arranged in a space enclosed by the aforementioned substrates 21 and 22 and the sealant 23.

The liquid crystal panel 20 forms an image by adjusting an alignment of the liquid crystals in the liquid crystal layer 24. Since the liquid crystal molecules are non-emitting material, the liquid crystal panel 20 needs to be supplied with light from a light source, such as the LEDs 51.

A first side of the TFT substrate 21 includes a driving part 25 supplying driving signals. The driving part 25 comprises a flexible printed circuit (FPC) 26, a driving chip 27 mounted on the flexible printed circuit 26, and a PCB 28 connected; e.g., coupled with the flexible printed circuit 26. The driving part 25, as shown in FIG. 1, has a COF (chip on film) structure, however, it is understood that it may have other well known structures, such as, a TCP (tape carrier package), a COG (chip on glass). Further, the driving part 25 may be formed on the TFT substrate 21.

The optical members 30 arranged at the rear or below the liquid crystal panel 20 include a light guide plate 31, a diffuser plate 32, a diffuser film 33, a prism film 34, and a protection film 35.

The light guide plate 31 is arranged above the LEDs 51, and diffuses the light from the LEDs 51 by refracting the incident light. A dot pattern may be formed on a surface of the light guide plate 31. The light guide plate 31 may be made of acryl-containing material, such as PMMA (poly methyl meta acrylate). The light guide plate 31 is thicker than the diffuser plate 32, the diffuser film 33, the prism film 34 and the protection film 35. The light guide plate 31 includes a plurality of rows of light blocking parts 36. The light blocking parts 36 are arranged on a surface of the light guide plate 31 that faces the LEDs 51, and the light blocking part 36 has substantially the same size as the LED 51. The light blocking part 36 blocks the light from the LED 51 that is perpendicular to the liquid crystal panel 20, thereby improving a color uniformity. The light blocking part 36 may be made of the same material as the reflective plate 40. In this case, the light from the LED 51 to the light blocking part 36 is reflected back to the reflective plate 40.

The diffuser plate 32 and the diffuser film 33 each comprises a base plate and a coating layer in the shape of beads formed on the base plate. Two or three diffuser films 33 may be layered or arranged on the diffuser plate 32.

Triangular prisms may be arranged at a constant interval on the prism film 34. The prism film 34 concentrates diffused light from the diffuser film 33 in a substantially vertical direction to a surface of the liquid crystal panel 20. Two prism films 34 are generally used. A prism formed on each prism film 34 forms a predetermined angle with respect to the prism film 34. Light passing through the prism film 34 travels in a substantially vertical direction to the liquid crystal panel 20, thereby generating a substantially uniform brightness distribution.

The protection film 35 protects the prism film 34 from being scratched or damaged.

A through hole 43 may be formed on the reflective plate 40 that corresponds with the LED 51. The reflective plate 40 is arranged between the LED 51 and a LED heat discharging unit 52. The through holes 43 are arranged in the same formation as the LEDs 51. For example, as shown in the embodiment in FIG. 1, four of the through hole rows 45 where the through holes 43 are arrayed in a row, are arranged in parallel with each other at a constant interval or space. The LED heat discharging unit 52 may be made of a metal material and discharges heat generated by the LED 51.

A reflection of light includes a diffuse reflection and a specular reflection. The diffusion reflection occurs when the light is incident upon a surface having a roughness that is larger than a wavelength of a visible ray, e.g., about 400 nm to about 700 nm. However, when the roughness is less than the wavelength of the visible ray, the specular reflection occurs.

According to the present embodiment, the reflective plate 40 includes a first reflective part 41 and a second reflective part 42, each having a different surface roughness. The surface roughness of the second reflective part 42 is less than the surface roughness of the first reflective part 41. For example, the first reflective part 41 has a surface roughness that is at least about 700 nm, thereby allowing the diffuse-reflected incident light. The second reflective part 42 has a surface roughness that is less than about 400 nm, thereby allowing the specular-reflected incident light.

The second reflective part 42 may be shaped like a bar or a strip, and is positioned approximately halfway between the adjacent through hole rows 45. The first reflective part 41 includes a base film 46 and a diffuse reflective layer 47 arranged on the base film 46. The base film 46 may be made of polyethylenterephthalate (PET) or polycarbonate (PC). The diffuse reflective layer 47 includes beads made of $CaCO_3$. The reflective plate 40 is sufficiently thick so as to not shrink due to the heat generated from the LED 51.

The second reflective part 42 includes the base film 46 and a specular reflective layer 48 arranged on the base film 46. The specular reflective layer 48 includes Ag. Alternatively, the specular reflective layer 48 may have a polyethylene naphthalate (PEN) single layered structure or may be a multi-layered structure.

Alternatively, the second reflective part 42 and the first reflective part 41 may be a single body. For example, a treatment may be applied on the surface of the first reflective part 41 to form the second reflective part 42 or the second reflective part may be made of only the base film 46. According to the present embodiment, the surface treatment includes coating the surface with a metal layer having a relatively small surface roughness by a sputtering method. According to another example, the second reflective part 42 may be formed by adhering a silver sheet or a film having a relatively small surface roughness on the reflective plate 40.

A traveling direction of the light from the LED 51 may be adjusted. Since the light traveling directly upward reduces a color uniformity of the light, the light emitted from an upper part of the LED 51 should be limited. The LEDs 51, which emit red, green and blue colors, respectively, are arrayed in a row on the LED circuit substrate 60, thereby generating a white color. Four LED circuit substrates 60 are arrayed at the same interval. However, the number of the LED circuit substrates 60 may vary according to a size of the backlight or a required brightness. Accordingly, the LED rows 55 mounted or attached on the LED circuit substrate 60 are arrayed at the same interval.

The LED circuit substrate 60 includes a PCB and an Al layer. The aforementioned liquid crystal panel 20, the optical member 30, the reflective plate 40, the LED 51, and the LED circuit substrate 60 are accommodated or contained in an upper chassis 10 and a lower chassis 70.

Due to the following reasons, a bright line is not generated in the LCD 1 according to the embodiment of the invention.

Figure 3:
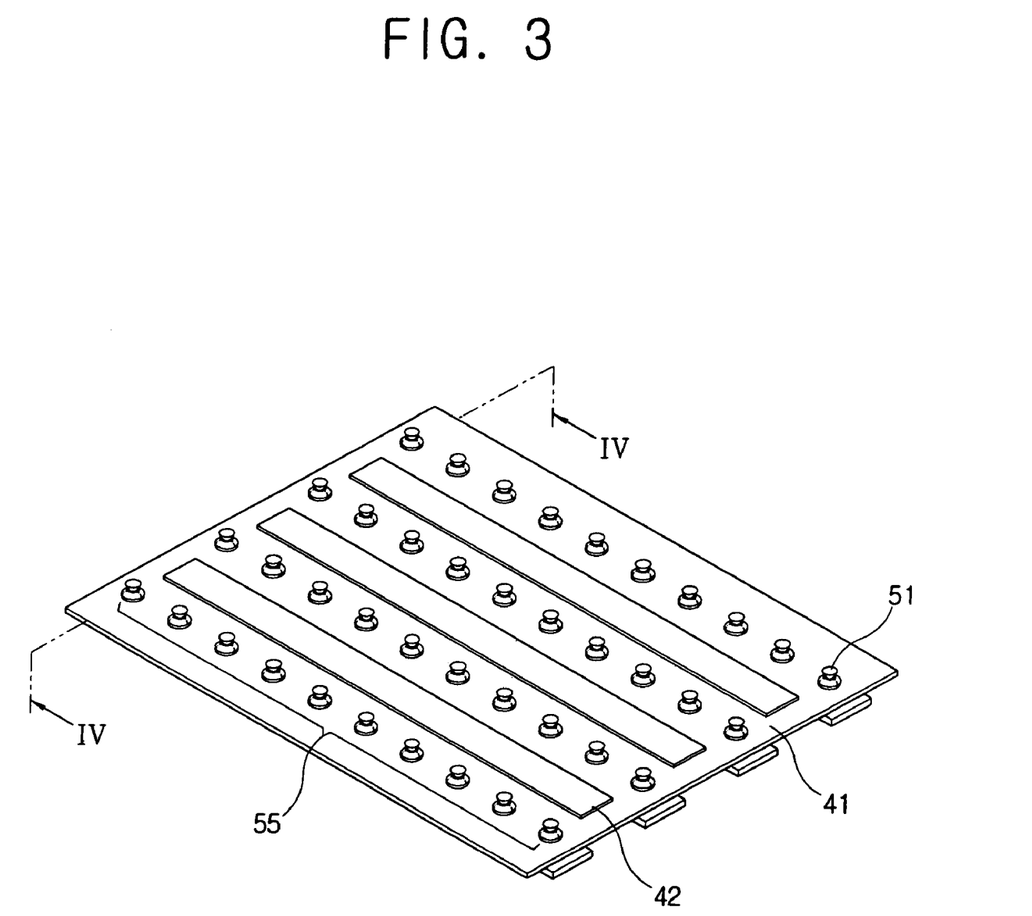
FIG. 3 shows an arrangement of the reflective plate and the LED according to the embodiment of the invention.

According to the embodiment of the invention shown in FIG. 3, more than 90% of the light is emitted from the sides of the LED 51. Such LED 51 is defined as a side emitting LED.

The light emitted from an upper part of the LED 51 is blocked by the light blocking part 36 of the light guide plate 31. Therefore, only about 2 to about 3 percent of the light from the LED 51 passes through the light blocking part 36. The light from the LED 51 mostly travels straight; e.g., in a vertical direction. Such straight traveling of the light increases the intensity of the light and concentrates the light. However, when the red, green, and blue LEDs emit light separately, the straight progressing light reduces color uniformity. To solve the foregoing problem, the light emitted from an upper part of the LED 51 should be reduced, and the light traveling straight from the upper part of the LED should be blocked.

A region between the adjacent two LEDs 51 brightens due to the light reflected from the reflective plate 40 being added to the direct light emitted from the LED 51. Accordingly, the brightness difference between the region above the LED 51 and the region between the two LEDs 51 results in a line being generated along the space between the LED rows 55. The present invention reduces such a line by having the second reflective part 42 disposed between the LEDs 51.

Figure 4:
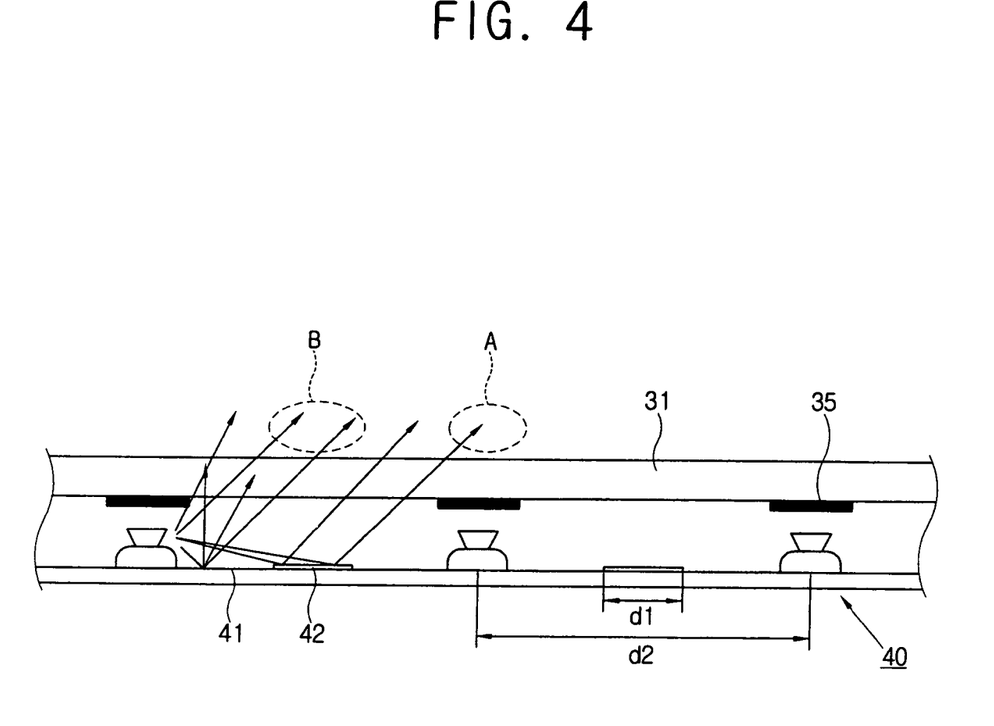
FIG. 4 shows why bright lines reduce in the LCD comprising the reflective plate according to the embodiment of the invention.

Referring to FIG. 4, the second reflective part 42 of the reflective plate 40 is arranged between the LED rows 55. The second reflective part 42 may be a strip or a bar-like shape and is positioned approximately halfway between the two adjacent LED rows 55. The LED rows 55 are arranged along a constant interval d2, and the width d1 of the second reflective part 42 is about 10 percent to about 40 percent of the interval d2.

According to the above described configuration, most of the light coming from an upper part of the LED 51 is blocked by the light blocking part 36, whereby some of the light is transmitted directly to a region A that is above the LED 51. The light emitted from the sides of the LED 51 is partly delivered direct to the region B that is between the LEDs. The rest of the light emitted from the sides of the LED 51 is reflected by the first reflective part 41 and/or the second reflective part 42 and then travels toward the light guide plate 31. As shown in FIG. 4, the incident light on the first reflective part 41 is diffuse-reflected in various directions and reaches region A and region B.

Unlike the light reflected by the first reflective part 41, the incident light upon the second reflective part 42 is specular-reflected. The specular-reflected light travels along a route such that not as much of the specular-reflected light reaches region B as the diffuse-reflected light. Accordingly, the light is distributed substantially uniformly along the entire light guide plate 31, thereby reducing the bright lines generated.

Figure 5:
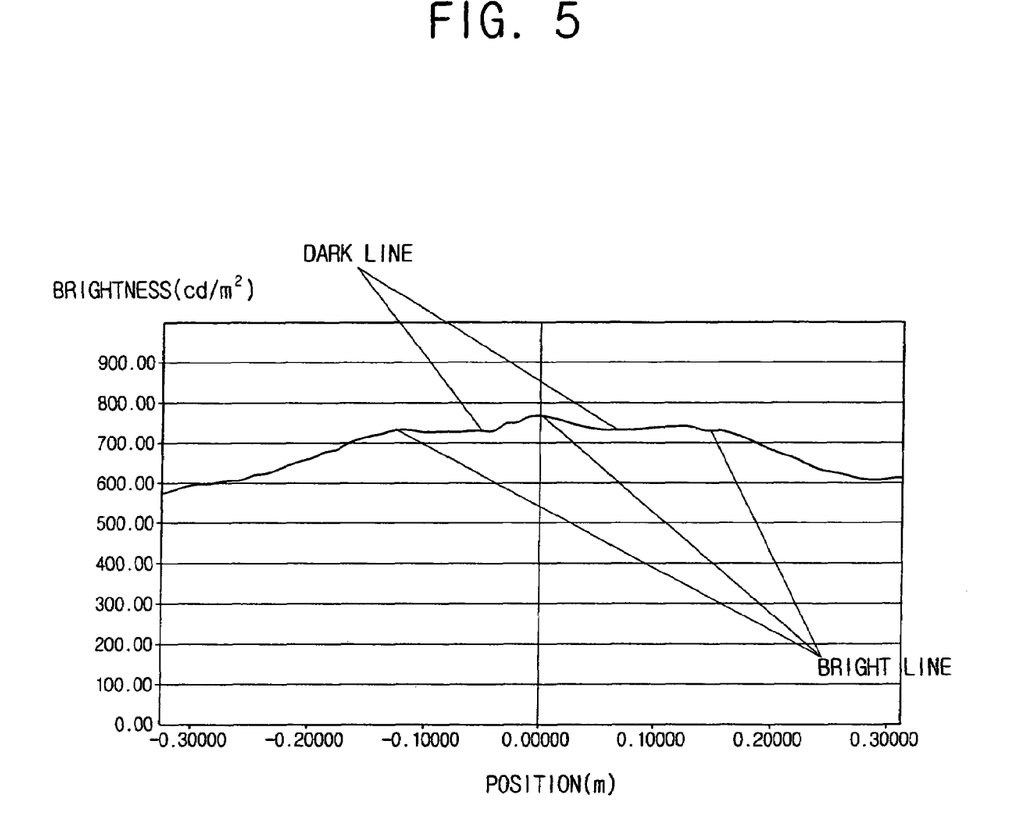
FIG. 5 is a graph showing a brightness distribution of a conventional LCD.
Figure 6:
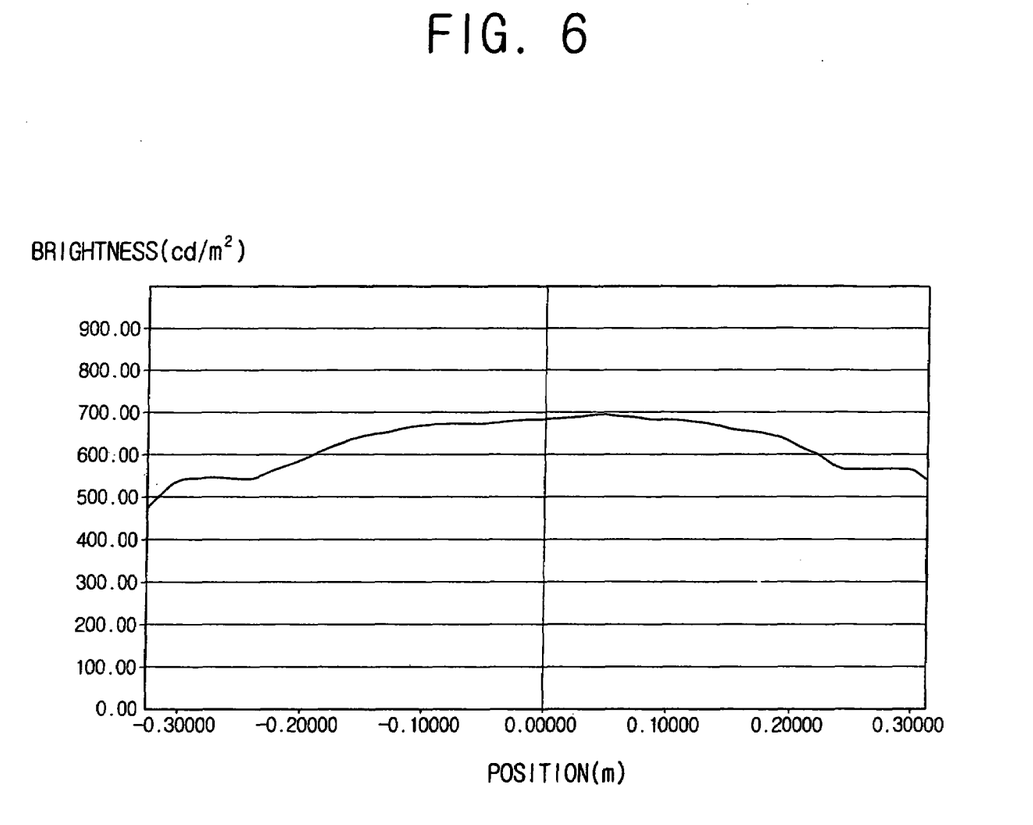
FIG. 6 is a graph showing a brightness distribution of the LCD including the reflective plate according to the first embodiment of the present invention.

FIG. 5 is a graph showing a brightness distribution of a conventional LCD. FIG. 6 is a graph showing a brightness distribution of the LCD comprising the reflective plate according to the first embodiment of the invention. FIG. 6 is based on a sectional view taken along the IV-IV line of FIG. 3, and represents a brightness distribution of a direction that is substantially perpendicular to a direction along which the LED row 55 extends.

Referring to FIG. 5, the conventional LCD, having no second reflective part 42 and thus diffuse-reflecting all the incident light, has three bright lines formed between the LED rows 55 and two dark lines formed between the adjacent bright lines. The bright line disposed in the middle of the three bright lines is the brightest line.

On the other hand, the LCD shown in FIG. 6 has the second reflective part 42 provided on the reflective plate 40, thereby showing neither the bright line nor the dark line. Instead, FIG. 6 shows a Gaussian distribution where the brightest spot exists at substantially a center area.

Considering FIG. 5 and FIG. 6, the second reflective part 42 provided on the reflective plate 40 is arranged at the same region where the bright line occurs. According to such arrangement, the second reflective part 42 specular-reflects the incident light, thereby preventing or substantially preventing the light from traveling above the second reflective part 42. Accordingly, less bright lines occur at the region above the second reflective part 42.

Figure 7A:
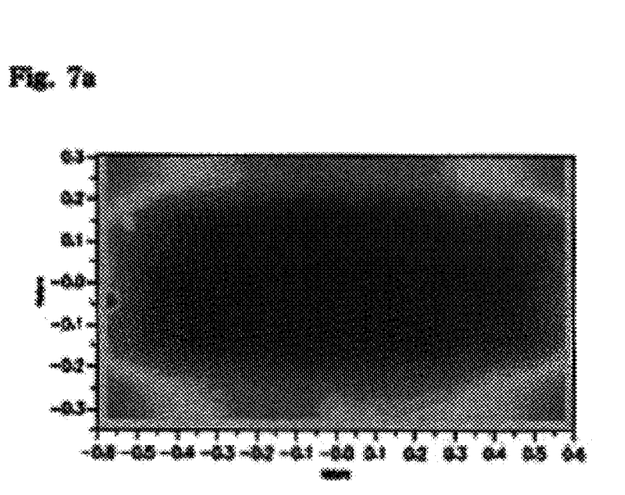
FIGS. 7A, 7B, 7C, and 7D illustrate brightness distributions of an LCD according to a width of a second reflective part.
Figure 7B:
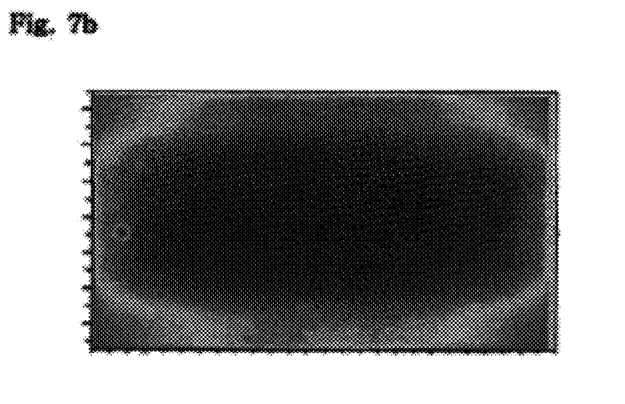
Figure 7C:
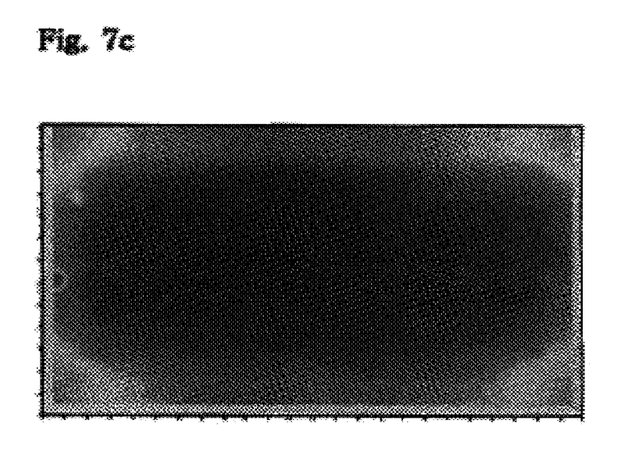
Figure 7D:
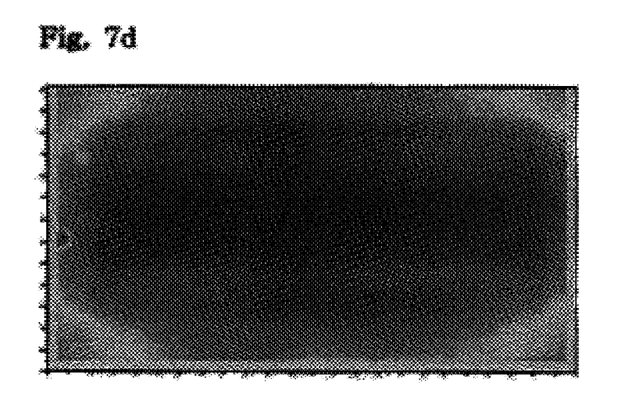

FIG. 7A shows a brightness distribution for an LCD that does not have a second reflective part 42. FIGS. 7B, 7C, and 7D show brightness distributions in the case the width d1 of the second reflective part 42 is 12, 22, and 45 percent of the interval d2 between the adjacent LED rows 55, respectively. As shown in the above described figures, the bright line occurs in FIGS. 7A, 7B, 7C, and 7D, but not in FIG. 7B and FIG. 7C. Therefore, the width d1 of the second reflective part 42 is preferably about 10 percent to about 40 percent of the interval d2 of the adjacent LED rows 55.

Another embodiment of the invention is described below with reference to FIG. 8.

Figure 8:
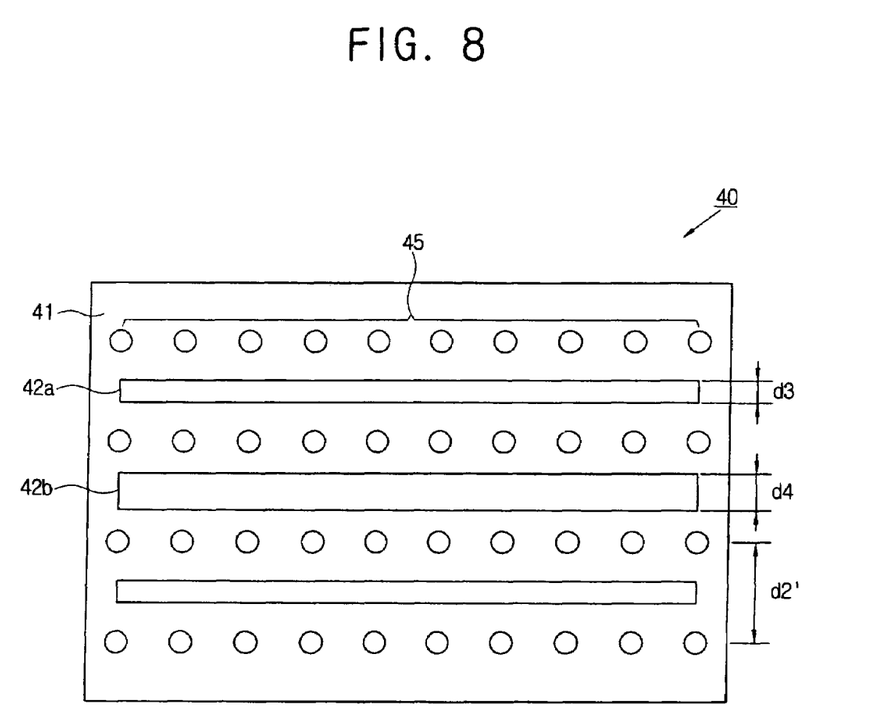
FIG. 8 is a front view of a reflective plate according to another embodiment of the invention.

As shown in FIG. 8, four through hole rows 45 parallel to each other are arranged on a reflective plate 40. The through hole rows 45 are arrayed with through holes 43 through which LEDs 51 are coupled with the reflective plate 40. The through hole rows 45 are arranged along a constant interval d2'. Three second reflective parts 42 are arranged between the through hole rows 45. As described above and shown in FIG. 5 and FIG. 6, a screen is brightest at approximately a center region thereof. In FIG. 8, the width d4 of the middle second reflective part 42b is larger than a width d3 of the rest of the second reflective parts 42a to reduce the brightness at the center region of the screen, thereby substantially uniformly distributing the brightness of light for the entire display screen.

Yet another embodiment of the invention is described below with reference to FIG. 9.

Figure 9:
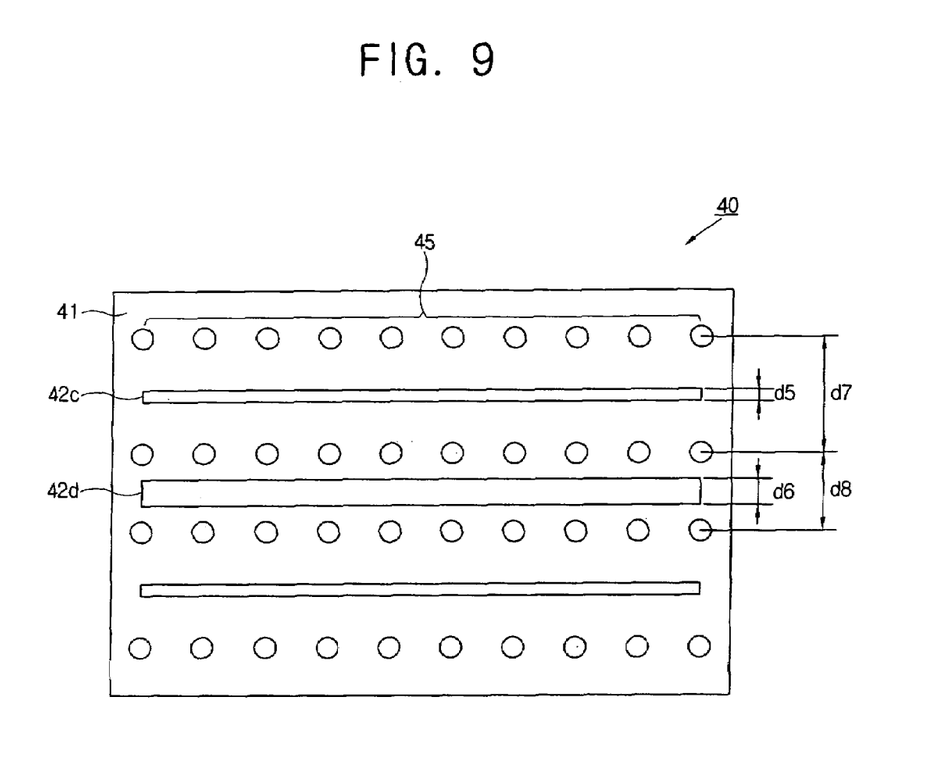
FIG. 9 is a front view of a reflective plate according to yet another embodiment of the invention.

Referring to FIG. 9, four through hole rows 45 parallel to each other are arranged on a reflective plate 40. Through holes 43 through which LEDs 51 are coupled to the reflective plate 40 are arranged on the through hole row 45.

Unlike the above described embodiments of the invention, an interval between the adjacent through hole rows 45 is not constant. Instead, an interval d7 between the outer through hole rows 45 is larger than the interval d8 between the inner through hole rows 45. The width d5 of an outer second reflective part 42c is less than a width d6 of an inner second reflective part 42d. For example, the width of the second reflective part 42 that is arranged between the through hole rows 45 is substantially inversely proportional to the interval between the through hole rows 45.

When the interval between the through hole rows 45 is sufficiently narrow such that the interval between the LEDs 51 arranged on the through hole rows 45 is also narrow, the light travels along a substantially direct path; therefore, the light emitted from the LED 51 is not substantially uniformly distributed but concentrated. Alternatively, when the interval between the through hole rows 45 is sufficiently wide such that the LEDs 51 disposed on the through hole row 45 are also wide, the light progresses along a long and non-direct path and thus the light is substantially uniformly diffused. Accordingly, when the interval between the through hole rows 45 is sufficiently narrow, the corresponding second reflective part 42 should be sufficiently wide to diffuse the light uniformly. When the interval between the through hole rows 45 is widened, the generation of bright line may be reduced; however, the entire brightness may be deteriorated.

The embodiments described above may be modified in various ways. For example, the LED may be arranged on the LED row and between the LED rows, which changes the shape of the LED circuit substrate and changes the arrangement of the through holes of the reflective plate to correspond with the arrangement of the LEDs.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A reflective plate, comprising:
   a first reflective part having a predetermined surface roughness; and
   a second reflective part having a surface roughness that is less than the predetermined surface roughness of the first reflective part, wherein the first reflective part diffuse-reflects an incident light, and the second reflective part specular-reflects the incident light.

2. The reflective plate of claim 1, wherein the second reflective part comprises a bar-like shape.

3. The reflective plate of claim 2, wherein there is at least two of the second reflective parts that are arranged in parallel with each other.

4. The reflective plate of claim 3, wherein the second reflective parts are spaced apart at a constant interval.

5. The reflective plate of claim 1, wherein the surface roughness of the first reflective part is at least about 700 nm, and the surface roughness of the second reflective part is no greater than 400 nm.

6. The reflective plate of claim 1, further comprising:
   a through hole row arranged on the first reflective part, the through hole being parallel with the second reflective part.

7. The reflective plate of claim 6, wherein the through hole row and the second reflective part are alternatively arranged.

8. The reflective plate of claim 6, wherein a width of the second reflective part is about 10 percent to about 40 percent of an interval between the adjacent through hole rows.

9. An LCD, comprising:
   an liquid crystal panel;
   a plurality of LED rows comprising LEDs and arranged in parallel with each other along a rear portion of the liquid crystal panel; and
   a reflective plate arranged below the plurality of LED rows, the reflective plate comprising:
      a first reflective part having a predetermined surface roughness; and
      a second reflective part having a surface roughness that is less than the predetermined surface roughness of the first reflective part, wherein the first reflective part diffuse-reflects an incident light, and the second reflective part specular-reflects the incident light.

10. The LCD of claim 9, wherein the second reflective part is arranged along approximately a center region of an interval between the adjacent LED rows.

11. The LCD of claim 9, wherein a width of the second reflective part is substantially inversely proportional to the interval between the adjacent LED rows.

12. The LCD of claim 9, wherein a width of the second reflective part is about 10 percent to about 40 percent of the interval between the adjacent LED rows.

13. The LCD of claim 9, further comprising:
   a LED circuit substrate coupled with the LED, wherein the reflective plate is arranged on the LED circuit substrate.

14. The reflective plate of claim 8, wherein all of the through hole rows are spaced apart equally.

* * * * *